United States Patent
Yoshizawa et al.

(10) Patent No.: US 6,836,346 B2
(45) Date of Patent: Dec. 28, 2004

(54) METHOD AND APPARATUS FOR IMAGE PROCESSING, AND A COMPUTER PRODUCT

(75) Inventors: Fumio Yoshizawa, Kanagawa (JP); Takeharu Tone, Tokyo (JP); Hideto Miyazaki, Kanagawa (JP); Yoshiyuki Namizuka, Kanagawa (JP); Hiroyuki Kawamoto, Kanagawa (JP); Sugitaka Oteki, Tokyo (JP); Rie Ishii, Tokyo (JP); Hiroaki Fukuda, Kanagawa (JP); Yuji Takahashi, Kanagawa (JP); Shinya Miyazaki, Tokyo (JP); Yasuyuki Nomizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 897 days.

(21) Appl. No.: 09/748,240

(22) Filed: Dec. 27, 2000

(65) Prior Publication Data

US 2001/0012113 A1 Aug. 9, 2001

(30) Foreign Application Priority Data

Dec. 27, 1999 (JP) .......................................... 11-371899

(51) Int. Cl.$^7$ ............................. H04N 1/46; G06K 9/76; G06K 9/32
(52) U.S. Cl. ........................ 358/1.9; 358/521; 358/532; 382/210; 382/298; 345/472
(58) Field of Search .................................. 358/3.1, 3.06, 358/521, 530, 532; 382/199, 210, 258, 298; 348/254; 345/428, 499, 472, 472.1, 472.2; 399/9

(56) References Cited

U.S. PATENT DOCUMENTS

| | | | |
|---|---|---|---|
| 5,050,221 A | 9/1991 | Ohat et al. ...................... 382/9 |
| 5,485,289 A | * 1/1996 | Curry .......................... 358/2.1 |
| 5,847,398 A | * 12/1998 | Shahar et al. .......... 250/370.09 |
| 6,041,139 A | 3/2000 | Okubo et al. ................ 382/199 |
| 6,151,457 A | 11/2000 | Kawamoto ...................... 399/9 |
| 2001/0012113 A1 | * 8/2001 | Yoshizawa et al. .......... 358/1.9 |

FOREIGN PATENT DOCUMENTS

| | | | |
|---|---|---|---|
| JP | 9-294209 | 11/1997 | .......... H04N/1/405 |
| JP | 10-327316 | 12/1998 | .......... H04N/1/393 |

OTHER PUBLICATIONS

U.S. patent application Ser. No. 09/748,240, Yoshizawa et al., filed Dec. 27, 2000.
U.S. patent application Ser. No. 10/393,945, Namizuka, filed Mar. 24, 2003.
U.S. patent application Ser. No. 10/646,754, Kodama et al., filed Aug. 25, 2003.
U.S. patent application Ser. No. 10/641,049, Nomizu, filed Aug. 15, 2003.
U.S. patent application Ser. No. 10/647,337, Sakuyama et al., filed Aug. 26, 2003.
U.S. patent application Ser. No. 10/659,349, Nomizu et al., Sep. 11, 2003.
U.S. patent application Ser. No. 10/632,957, Namizuka, filed Aug. 4, 2003.
U.S. patent application Ser. No. 10/663,804, Yogami et al., filed Sep. 17, 2003.

(List continued on next page.)

Primary Examiner—Jerome Grant, III
(74) Attorney, Agent, or Firm—Oblon, Spivak, McClelland, Maier & Neustadt, P.C.

(57) ABSTRACT

In the image processing apparatus a matrix selector selects a position matrix for determining the gradation direction. The gradation direction is the direction of a contrast of a gradation at a position of a target pixel and a dispersion matrix for determining a spatial frequency at the position of the target pixel. Further, a pixel interpolator divides the target pixel into still smaller pixels. A table selector selects a conversion table for determining a gradation level of the smaller pixels based on the gradation level of the target pixel, the position matrix and the dispersion matrix.

17 Claims, 16 Drawing Sheets

OTHER PUBLICATIONS

U.S. patent application Ser. No. 10/682,121, Hara et al., filed Oct. 10, 2003.
U.S. patent application Ser. No. 10/687,625, Kawamoto et al., filed Oct. 20, 2003.
U.S. patent application Ser. No. 10/691,623, Hara et al., filed Oct. 24, 2003.
U.S. patent application Ser. No. 10/716,463, Kodama et al., filed Nov. 20, 2003.
U.S. patent application Ser. No. 10/703,509, Nomizu et al., filed Nov. 10, 2003.
U.S. patent application Ser. No. 10/668,360, Ohyama et al., filed Sep. 24, 2003.
U.S. patent application Ser. No. 10/663,784, Shirata et al., filed Sep. 17, 2003.
U.S. patent application Ser. No. 10/716,429, Nomizu et al., filed Nov. 20, 2003.
U.S. patent application Ser. No. 10/805,184, Namizuka, filed Mar. 22, 2004.
U.S. patent application Ser. No. 09/024,290, filed Feb. 17, 1998, pending.
U.S. patent application Ser. No. 09/122,108, filed Jul. 24, 1998, pending.
U.S. patent application Ser. No. 09/161,225, filed Sep. 28, 1998, pending.
U.S. patent application Ser. No. 09/266,800, filed Mar. 12, 1999, pending.
U.S. patent application Ser. No. 09/262,317, filed Mar. 4, 1999, pending.
U.S. patent application Ser. No. 09/348,631, filed Jul. 6, 1999, pending.
U.S. patent application Ser. No. 09/437,088, filed Nov. 9, 1999, pending.
U.S. patent application Ser. No. 09/443,889, filed Nov. 19, 1999, pending.
U.S. patent application Ser. No. 09/468,954, filed Dec. 22, 1999, pending.
U.S. patent application Ser. No. 09/484,254, filed Jan. 18, 2000, pending.
U.S. patent application Ser. No. 09/551,509, filed Apr. 17, 2000, pending.
U.S. patent application Ser. No. 10/360,749, Namizuka, filed Feb. 10, 2003.

* cited by examiner

FIG.4

| 251 | 245 | 237 | 253 |
|---|---|---|---|
| 235 | 227 | 229 | 247 |
| 243 | 225 | 231 | 239 |
| 249 | 233 | 241 | 255 |

M18

| 0 | 0 | 0 | 0 |
|---|---|---|---|
| 0 | 1 | 1 | 0 |
| 0 | 1 | 1 | 0 |
| 0 | 0 | 0 | 0 |

M28 M38

| 59 | 53 | 45 | 61 |
|---|---|---|---|
| 43 | 35 | 37 | 55 |
| 51 | 33 | 39 | 47 |
| 57 | 41 | 49 | 63 |

M12

| 0 | 0 | 0 | 0 |
|---|---|---|---|
| 0 | 1 | 1 | 0 |
| 0 | 1 | 1 | 0 |
| 0 | 0 | 0 | 0 |

M22 M32

| 27 | 21 | 13 | 29 |
|---|---|---|---|
| 11 | 3 | 5 | 23 |
| 19 | 1 | 7 | 15 |
| 25 | 9 | 17 | 31 |

M11

| 0 | 0 | 0 | 0 |
|---|---|---|---|
| 0 | 0 | 0 | 0 |
| 0 | 0 | 0 | 0 |
| 0 | 0 | 0 | 0 |

M21 M31

DITHER MATRIX      POSITION MATRIX      DISPERSION MATRIX

FIG.5

| 225 | 241 | 233 | 247 | 239 | 251 |
|---|---|---|---|---|---|
| 249 | 231 | 255 | | 229 | 253 | 227 | 245 | 237 | 243 | 235 |

M48

(Dither matrix values: 225, 241, 233, 247, 239, 251, 249, 231, 255, 229, 253, 227, 245, 237, 243, 235)

M58 — position matrix (arrows)

M68 — dispersion matrix (all 1s)

| 33 | 49 | 41 | 55 | 47 | 59 |
|---|---|---|---|---|---|

(Dither matrix M42 values: 33, 49, 41, 55, 47, 59, 57, 39, 63, 37, 61, 35, 53, 45, 51, 43)

M52 — position matrix (arrows)

M62 — dispersion matrix (all 1s)

(Dither matrix M41 values: 1, 17, 9, 23, 15, 27, 25, 7, 31, 21, 13, 19, 11, 5, 29, 3)

M51 — position matrix (arrows)

M61 — dispersion matrix (all 1s)

DITHER MATRIX     POSITION MATRIX     DISPERSION MATRIX

METHOD AND APPARATUS FOR IMAGE PROCESSING, AND A COMPUTER PRODUCT

FIELD OF THE INVENTION

The present invention in general relates to a technology for image processing. More particularly, this invention relates to a technology for halftone processing by varying the resolution.

BACKGROUND OF THE INVENTION

When a document image input via a scanner or a personal computer (PC) or a document image received by a facsimile is printed on paper, conventionally, the resolution or the gradation of the image is. For example, if image data of an n-level is converted into image data of an m-level (n>m) having a double resolution, the resolution has been first doubled by the same processing as magnification processing, and then, gradation processing has been performed. Otherwise, contrary to the above-described procedure, the magnification processing has followed the gradation processing.

When image is a color image and an image forming apparatus is adapted to output a black-and-white image, it has been necessary to vary the gradation. Alternatively, when the resolution of the image is so high that the image forming apparatus cannot satisfy the requirements, it has been necessary to adjust the gradation. That is, when an input image and an output image are not the same in properties as each other, it has been necessary to adjust the resolution or gradation. In other words, the resolution or gradation has been adjusted so as to allow the input image and the output image to be viewed as similarly as possible by fitting the images to the visual characteristics of humans. Such adjustment could provide the output image with less inconsistency with the input image.

Such a magnification processing is disclosed in Japanese Patent Application Laid-Open No. 10-327316. Further, the gradation processing is disclosed in Japanese Patent Application Laid-Open No. 9-294209.

However, the technique of image processing disclosed in the above-mentioned publication has the following problems. That is, when the magnification processing is followed by the gradation processing, the gradation processing is performed by the use of image data having the increased number of pixels after the magnification processing, i.e., image data having an increased capacity. Consequently, there has arisen a problem that a large-capacity memory for temporarily storing n-level image data after the magnification processing is required, although the image data to be finally output as a processing result is image data of an m-level less than an n-level. Namely, there has arisen a problem of the necessity of the large-capacity memory which is used only temporarily in view of the processing.

Furthermore, since the image processing apparatus need input or output other image data in smooth association with other image processing, there is a demand that no image processing section which is liable to induce a rate-determining factor is provided as possible. Therefore, there has arisen a problem of the necessity of an arithmetic unit having high performance only to smoothly interpolate or vary the gradation of the image data having the capacity increased by the magnification processing from the n-level to the m-level.

In the meantime, when the gradation processing is followed by the magnification processing, since a pixel is interpolated (magnified) with respect to image data which has been already subjected to m-level processing, there has arisen a problem that n-level image information to be input cannot be sufficiently used, thereby reducing the quality of an image. In other words, there has arisen a problem of more conspicuous inconsistency of the output image with respect to the input image.

Moreover, in recent years, there have been devised a digital combined machine in which a facsimile functional section, a printer functional section and the like are added on a copying machine via a motherboard; a digital combined machine in which a copying machine functional section, a facsimile functional section, a printer functional section and the like are independently constituted into units, and image data to be input from each of the units is unified in the unit in charge of control or processing while being controlled by a process controller for controlling the processing of the entire apparatus; and the like.

In these digital combined machines, when each of the functional sections or units is improved in its function, the functional section or unit is replaced with an improved functional section or unit. Consequently, it is necessary to more appropriately adjust the resolution or gradation in order to obtain an output image with less inconsistency with the input image. However, it is uneconomical to replace a memory of a large capacity which is used only temporarily with a memory of a larger capacity or replace an arithmetic unit with an arithmetic unit of a higher speed every time some of the functional units are improved, thus arising a problem that efficient image processing cannot be performed by the use of the existing memory or arithmetic unit.

SUMMARY OF THE INVENTION

It is an object of the present invention to provide a technique in which resolution varying processing and gradation varying processing can be performed, so as to reduce inconsistency between an input image and an output image, efficiently.

The image processing apparatus according to one aspect of the present invention comprises following units. That is, a gradation direction determining unit which determines a gradation direction; a spatial frequency determining unit which determines a spatial frequency at the pixel position of the target pixel; a dividing unit which divides the target pixel into fine pixels; and a gradation determining unit which determines a gradation level of the fine pixel produced by the dividing unit based on the gradation level of the target pixel, the gradation direction determined by the gradation direction determining unit and the spatial frequency determined by the spatial frequency determining unit.

According to the above-mentioned aspect of this invention, the gradation of the divided fine pixel can be determined even if the fine pixel is not temporarily stored in the storage unit such as a memory.

Furthermore, it is preferable that, the spatial frequency determining unit determines the spatial frequency at the pixel position of the target pixel based on the type of the image. Accordingly, a proper spatial frequency can be determined with respect to each of the pixels composing the image according to the kind of image.

Moreover, it is preferable that, the dividing unit bisects or quadrisects the target pixel. Accordingly, the image data composed of the fine pixels can be controlled by simple control.

Moreover, it is preferable that, a gradation varying unit is provided for varying the gradation level of the target pixel to a gradation level in a range narrower than that of the gradation level. Accordingly, the capacity of the image data can be reduced.

Moreover, it is preferable that, the gradation varying unit compares the gradation level of the target pixel with a predetermined threshold, so as to vary the gradation level of the target pixel. Accordingly, the gradation level can be varied by a simple comparing operation.

Moreover, it is preferable that, the gradation varying unit varies the gradation level of the target pixel by the use of a predetermined dither matrix. Accordingly, the gradation levels of the plurality of target pixels can be varied by one simple comparing operation.

Moreover, it is preferable that, the gradation determining unit determines a gradation level of the fine pixel produced by the dividing unit based on the dither matrix and the element position of the dither matrix. Accordingly, the gradation level of the fine pixel can be varied by a simple comparing operation.

The image processing method according to another aspect of the present invention comprises following steps. That is, determining a gradation direction; determining a spatial frequency at the pixel position of the target pixel; dividing the target pixel into fine pixels; and determining a gradation level of the fine pixel produced in the dividing step based on the gradation level of the target pixel, the gradation direction determined in the gradation direction determining step and the spatial frequency determined in the spatial frequency determining step.

According to the above-mentioned aspect of this invention, the gradation of the divided fine pixel can be determined even if the fine pixel is not temporarily stored in the storage unit such as a memory.

Furthermore, it is preferable that a step of varying the gradation level of the target pixel to a gradation level in a range narrower than that of the gradation level is added. Accordingly, the capacity of the image data can be reduced.

The computer readable recording medium according to still another aspect of the present invention stores a computer program which when executed realizes the image processing method according to the present invention.

Other objects and features of this invention will become apparent from the following description with reference to the accompanying drawings.

BRIEF DESCRIPTION OF THE DRAWINGS

FIG. 4 illustrate one example of matrices stored in a matrix storage in the image processing apparatus in the present embodiment;

FIG. 5 illustrate another example of matrices stored in the matrix storage in the image processing apparatus in the present embodiment;

DESCRIPTION OF THE PREFERRED EMBODIMENTS

Figure 1:
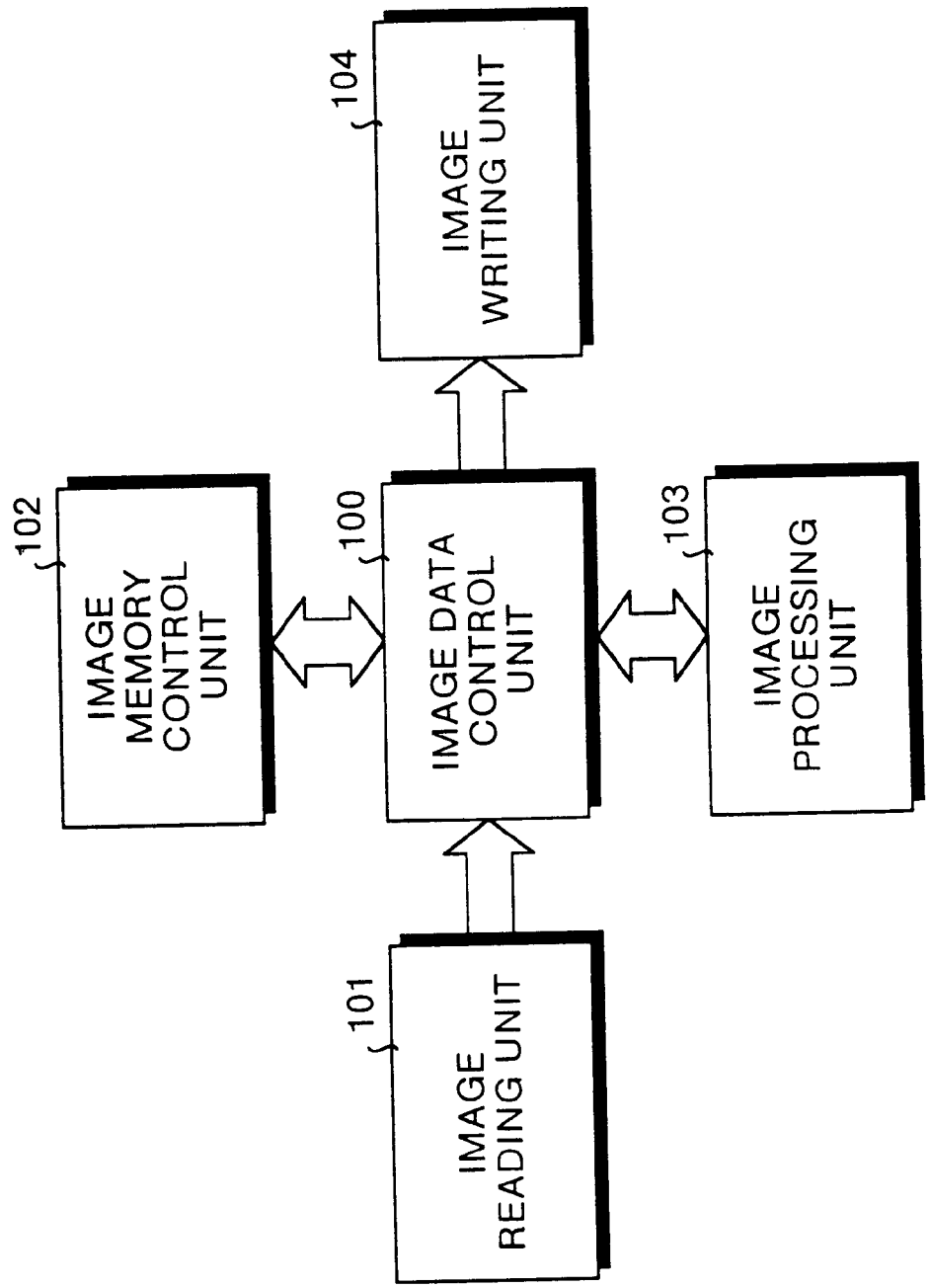
FIG. 1 is a block diagram functionally illustrating the arrangement of an image processing apparatus in a preferred embodiment according to the present invention.

A preferred embodiment of the present invention will be described below while referring to the drawings.

To begin with, the principle of the image processing apparatus in this embodiment will be explained. FIG. 1 is a block diagram functionally illustrating the arrangement of the image processing apparatus in the preferred embodiment according to the present invention. This image processing apparatus includes five units described below.

That is, the image processing apparatus includes an image data control unit 100; an image reading unit 101 for reading and inputting image data; an image memory control unit 102 for controlling an image memory for storing an image therein so as to write/read the image data; an image processing unit 103 for subjecting the image data to image processing such as edition; and an image writing unit 104 for writing the image data in a transfer sheet or the like.

The above-described units are arranged centering on the image data control unit 100: namely, the image reading unit 101, the image memory control unit 102, the image processing unit 103 and the image writing unit 104 are connected to the image data control unit 100.

Image Data Control Unit 100:

The image data control unit 100 undertakes, for example, the following processing:

(1) data compressing processing (primary compression) for the purpose of enhancing the bus transfer efficiency of data;

(2) processing of transferring the primarily compressed data to image data;

(3) image synthesizing processing which enables image data from a plurality of units to be synthesized, and further, includes synthesizing the image data on a data bus;

(4) image shifting processing which enables an image to be shifted in main and sub scanning directions;

(5) image region expanding processing which enables an image region to be magnified to the periphery by an arbitrary amount;

(6) image scaling processing to, for example, a fixed scale of 50% or 200%;

(7) parallel bus interface processing;

(8) serial bus interface processing with a process controller 211, described later;

(9) format converting processing between parallel data and serial data;

(10) interface processing with the image reading unit 101; and

(11) interface processing with the image processing unit 103.

Image Reading Unit 101:

The image reading unit 101 undertakes, for example, the following processing:

(1) processing of reading light reflected on an original by means of an optical system;

(2) processing of converting the light into an electric signal in a CCD (a charge coupled device);

(3) digitizing processing by means of an A/D (analog-to-digital) converter;

(4) shading correcting processing of correcting unevenness of illumination distribution of a light source; and (5) scanner γ correcting processing of correcting the concentration characteristics of a reading system.

Image Memory Control Unit 102:

The image memory control unit 102 undertakes, for example, the following processing:

(1) interface control processing with a system controller;

(2) parallel bus control processing (processing of controlling an interface with a parallel bus);

(3) network control processing;

(4) serial bus control processing (processing of controlling a plurality of outside serial ports);

(5) inside bus interface control processing (processing of controlling a command with respect to an operating unit);

(6) local bus control processing (processing of controlling accesses of the ROM, the RAM and font data for booting the system controller);

(7) processing of controlling operation of a memory module (processing of controlling a writing/reading operation of a memory module);

(8) memory module access control processing (processing of conciliating requests for a memory access from a plurality of units);

(9) data compressing/decompressing processing (processing of reducing data for the purpose of memory effective use); and

(10) image editing processing (processing of clearing data in a memory region, turning the image data, synthesizing images on a memory, and the like).

Image Processing Unit 103:

The image processing unit 103 undertakes, for example, the following processing:

(1) shading correcting processing (processing of correcting unevenness of illumination distribution of a light source);

(2) scanner γ correcting processing (processing of correcting the concentration characteristics of a reading system);

(3) MTF correcting processing;

(4) smoothing processing;

(5) arbitrarily scaling processing in a main scanning direction;

(6) concentration varying processing (γ varying processing: a concentration notch);

(7) simple multi-level processing;

(8) simple binary processing;

(9) error diffusing processing;

(10) dithering processing;

(11) dot arrangement phase control processing (processing of arranging dots rightward or leftward);

(12) isolated point eliminating processing;

(13) image region separating processing (color judgment, attribute judgment or adaptation); and

(14) density varying processing.

Image Writing Unit 104:

The image writing unit 104 undertakes, for example, the following processing:

(1) edge trimming processing (shagginess correcting processing);

(2) dot re-arrangement correcting processing;

(3) processing of controlling a pulse of an image signal; and (4) processing of converting a format of parallel data or serial data.

Figure 2:
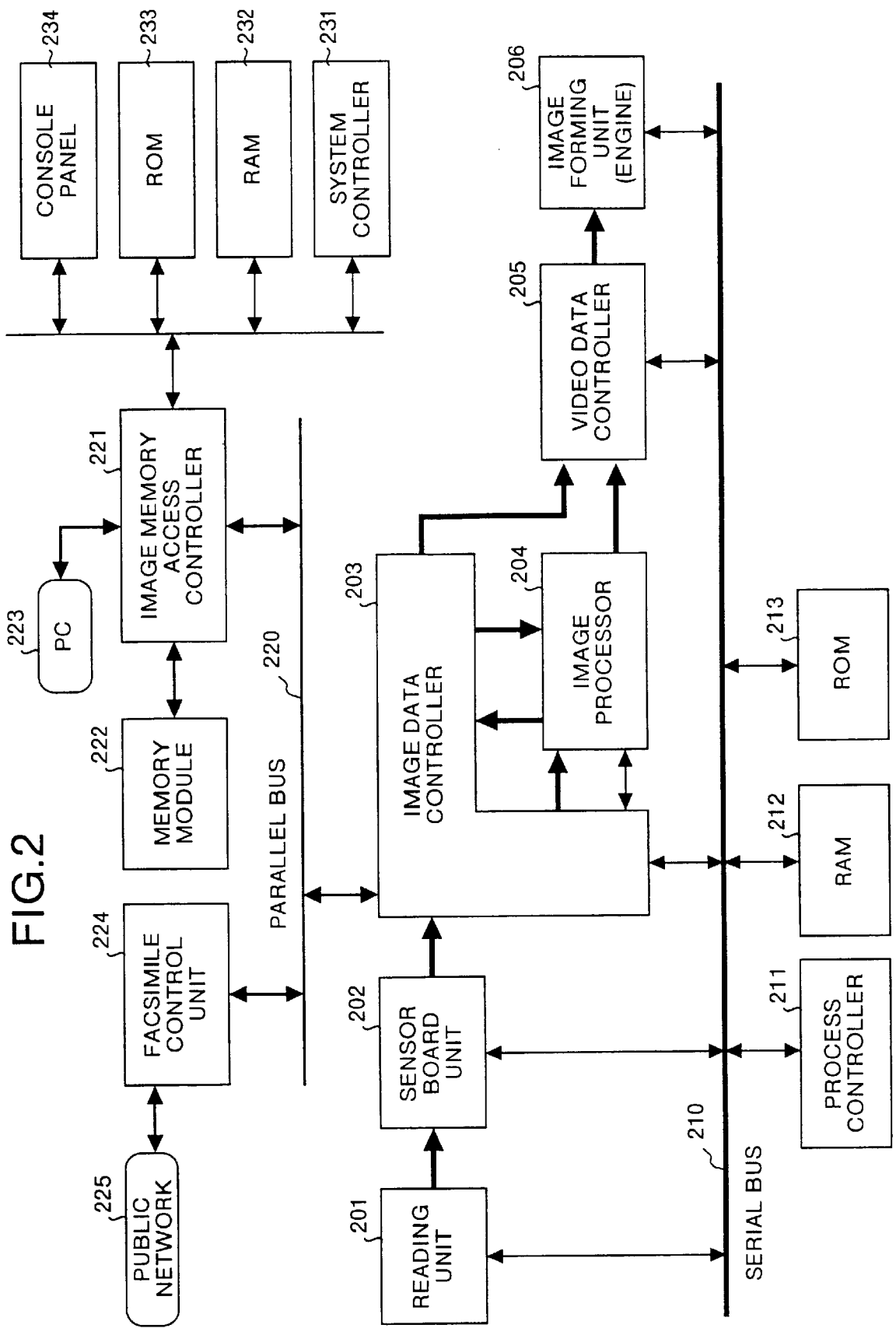
FIG. 2 is a block diagram illustrating one example of the hardware configuration of the image processing apparatus in the present embodiment.

Hardware Configuration of Digitally Combined Machine:

The hardware configuration, assuming that the image processing apparatus 105 is a digitally combined machine, will now be explained. FIG. 2 is a block diagram illustrating one example of the hardware configuration of the image processing apparatus in the present embodiment.

In the block diagram illustrated in FIG. 2, the image processing apparatus 105 in the present embodiment comprises a reading unit 201, a sensor board unit 202, an image data controller 203, an image processor 204, a video data controller 205 and an image forming unit (engine) 206. The image processing apparatus 105 in the present embodiment further comprises a process controller 211, a RAM 212 and a ROM 213 via a serial bus 210.

Moreover, the image processing apparatus in the present embodiment comprises an image memory access controller 221 and a facsimile control unit 224 via a parallel bus 220, and a memory module 222, a system controller 231, a RAM 232, a ROM 233 and a console panel 234, all of which are connected to the image memory access controller 221.

Here, a description will be given of the correlation between the above-mentioned constituent elements and the units 100 to 104 illustrated in FIG. 1. Namely, the reading unit 201 and the sensor board unit 202 fulfill the function of the image reading unit 101 illustrated in FIG. 1. In the same manner, the image data controller 203 serves the function of the image data controller unit 100. Furthermore, in the same manner, the image processor 204 carries out the function of the image processing unit 103.

Moreover, in the same manner, the video data controller 205 and the image forming unit (engine) 206 fulfill the function of the image writing unit 104. Additionally, in the same manner, the image memory access controller 221 and the memory module 222 serve the function of the image memory control unit 102.

The contents of the constituent elements will be described here. The reading unit 201 for optically reading an original is constituted of a lamp, mirrors and lenses, in which light reflected on the original with irradiation by the lamp is focused on a light receiving element by the mirrors and the lenses.

The light receiving element, for example, a CCD, is mounted on the sensor board unit 202. Image data converted into an electric signal by the CCD is further converted into a digital signal, to be then output (transmitted) from the sensor board unit 202.

The image data output (transmitted) from the sensor board unit 202 is input into (received by) the image data controller 203. All the transmission of the image data between the functional devices (the processing units) and the data buses is controlled by the image data controller 203.

The image data controller 203 transfers the image data to the sensor board unit 202, the parallel bus 220 and the image processor 204, and transmits the image data to the process controller 211 and the system controller 231 which manages the entire control of the image processing apparatus. Moreover, the RAM 212 is used as a work area of the process controller 211, and the ROM 213 stores therein a boot program for the process controller 211, and the like.

The image data output (transmitted) from the sensor board unit 202 is transferred (transmitted) to the image processor 204 via the image data controller 203, and then, deterioration of the signal associated with quantization to the optical system and a digital signal (i.e., deterioration of the signal in the scanner system) is corrected, thereby outputting (transmitting) the image data to the image data controller 203 again.

The image memory access controller 221 controls writing/reading of the image data in/from the memory module 222. Furthermore, the image memory access controller 221 controls the operation of each of the constituent elements connected to the parallel bus 220. Moreover, the RAM 232 is used as a work area of the system controller 231. The ROM 233 stores therein the boot program and the like for the system controller 231.

The console panel 234 inputs the processing to be performed by the image processing apparatus 105: for example, the kind of processing (copying, facsimile transmission, image reading, printing or the like), the number of sheets to be processed or the like. Consequently, it is possible to input image data control information. Incidentally, the content of the facsimile control unit 224 will be described later.

Subsequently, there are a job for accumulating the read image data in the memory module 222 for reuse and a job for not accumulating the read image data in the memory module 222. Now, each of the jobs will be explained below. As an example of the job for accumulating the read image data in the memory module 222, there is a method in which when a single original is copied onto a plurality of sheets, the reading unit 201 is operated only once, and then, the image data read by the reading unit 201 is accumulated in the memory module 222, and therefore, the accumulated image data is read out a plurality of times.

In contrast, as an example of the job for not accumulating the read image data in the memory module 222, when a single original is copied onto only one sheet, the read image data is simply reproduced as it is, and consequently, no access is required to the memory module 222 by the image memory access controller 221.

First of all, when the memory module 222 is not used, the data transferred from the image processor 204 to the image data controller 203 is returned again to the image processor 204 from the image data controller 203. The image processor 204 performs image quality processing for converting luminance data obtained by the CCD in the sensor board unit 202 into an area gradation.

The image data after the image quality processing is transferred from the image processor 204 to the video data controller 205. The signal, which has been converted into the area gradation, is subjected to post-processing relating to dot arrangement and pulse control for reproducing dots, and thereafter, a reproduced image is formed on a transfer sheet in the image forming unit 206.

Subsequently, a description will be given of a flow of the image data when additional processing, for example, a turn in an image direction, synthesis of images or the like is performed in reading the image accumulated in the memory module 222. The image data transferred to the image data controller 203 from the image processor 204 is transmitted to the image memory access controller 221 from the image data controller 203 via the parallel bus 220.

The image memory access controller 221 performs access control of the image data by the memory module 222, development of printing data in an outside personal computer (PC) 223, and compression/decompression of the image data for effective use of the memory module 222 based on the control of the system controller 231.

The image data transmitted to the image memory access controller 221 is accumulated in the memory module 222 after data compression, and the accumulated image data is read, as required. The read image data is decompressed to the original image data, and then, is returned to the image data controller 203 from the image memory access controller 221 via the parallel bus 220.

After the transmission from the image data controller 203 to the image processor 204, the image quality processing and the pulse control in the video data controller 205 are performed, thereby forming a reproduced image on a transfer sheet in the image forming unit 206.

In the flow of the image data, the function of the digitally combined machine can be served under the bus control in the parallel bus 220 and the image data controller 203. In order to exhibit the facsimile transmission function, the read image data is subjected to the image processing in the image processor 204, and then, is transferred to the facsimile control unit 224 via the image data controller 203 and the parallel bus 220. The facsimile control unit 224 performs data conversion with respect to a communication network, and then, transmits the data as facsimile data to a public telephone network (PN) 225.

In the meantime, as to the received facsimile data, network data from the public telephone network (PN) 225 is converted into image data in the facsimile control unit 224, and then, is transferred to the image processor 204 via the parallel bus 220 and the image data controller 203. In this case, dot rearrangement and the pulse control are performed in the video data controller 205, and thereafter, a reproduced image is formed on a transfer sheet in the image forming unit 206.

In the situation in which the plurality of jobs, for example, the copying function, the facsimile transmitting/receiving function, the printer outputting function and the like are operated in parallel, the assignment of the using priority of the image forming unit 206 and parallel bus 220 to the jobs is controlled by the system controller 231 and the process controller 211.

The process controller 211 controls the flow of the image data; in contrast, the system controller 231 controls the entire system and manages the booting of resources. Furthermore, the functions of the digitally combined machine are selectively input in the console panel (the operating unit) 234, and thus, the processing content of the copying function, the facsimile function or the like is set.

The system controller 231 and the process controller 211 communicate with each other via the parallel bus 220, the image data controller 203 and the serial bus 210. Specifically, the system controller 231 and the process controller 211 communicate with each other by converting a data format for a data interface between the parallel bus 220 and the serial bus 210 inside the image data controller 203.

Figure 3:
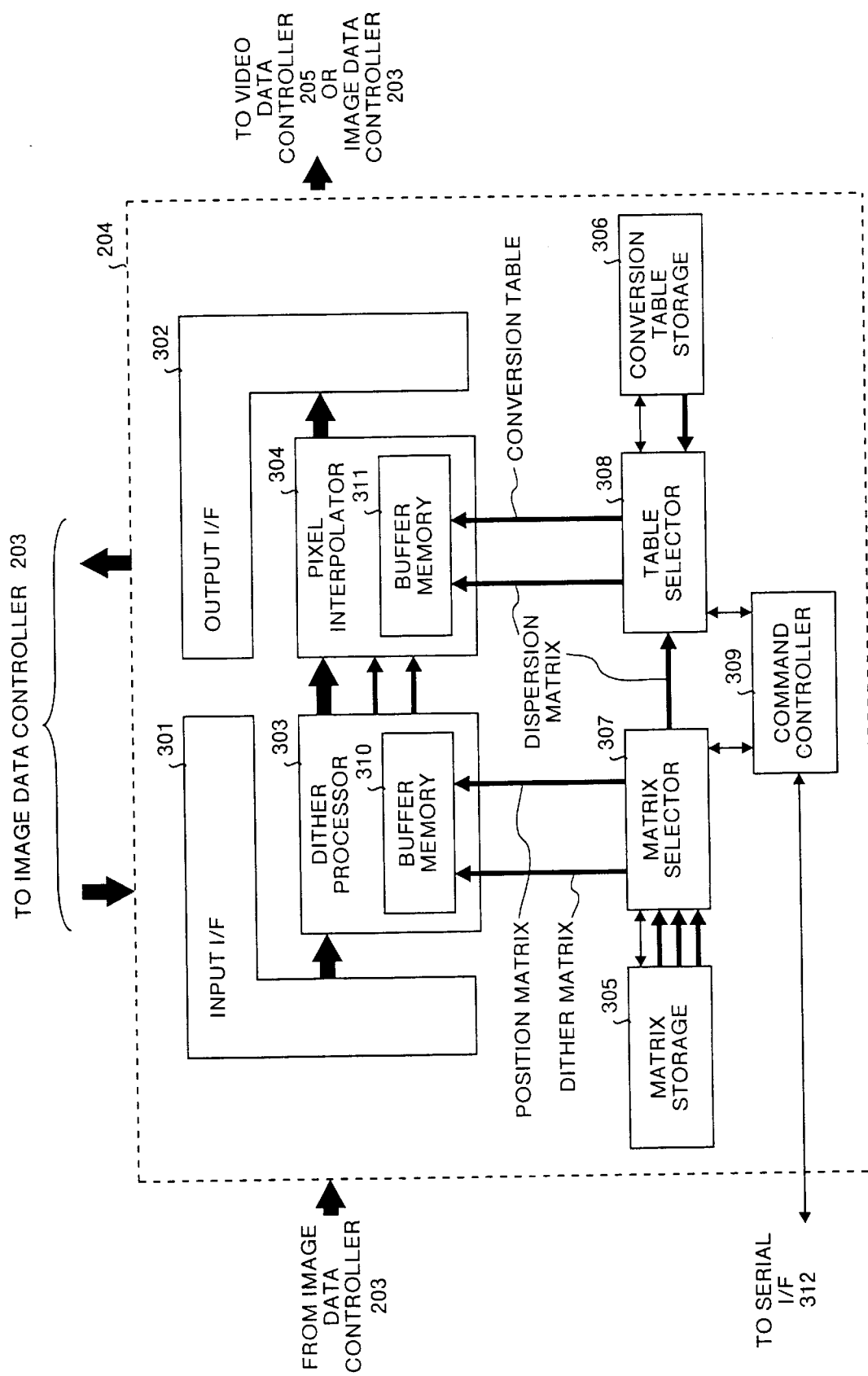
FIG. 3 is a block diagram illustrating the outline of processing in an image processor in the image processing apparatus in the present embodiment.

Image Processing Unit 103/Image Processor 204:

The outline of the processing in the image processor 204 constituting the image processing unit 103 will now be explained. FIG. 3 is a block diagram illustrating the outline of the processing in the image processor 204 in the image processing apparatus in the present embodiment.

In the block diagram of FIG. 3, the image processor 204 includes an input I/F 301 for inputting image data from the image data controller 203; an output I/F 302 for outputting the processed image data to the image data controller 203 or the video data controller 205; a dither processor 303 for subjecting the image data to dither processing; a pixel interpolator 304 for dividing the image data, and then, adjusting the gradation; a matrix storage 305 for storing therein dither matrices, position information matrices and dispersion matrices, all of which will be described later; a conversion table storage 306 for storing therein a conversion table, described later; a matrix selector 307 for selecting a matrix suitable for image processing from the matrix storage 305; a table selector 308 for selecting a conversion table suitable for the image data from the conversion table storage 306; and a command controller 309 for controlling each component of the image processor 204 including, of course, the matrix selector 307 and the table selector 308.

The dither processor 303 and the pixel interpolator 304 store therein a buffer memory 310 and another buffer memory 311 for storing therein image data and various matrices, respectively. Incidentally, a serial I/F 312 is a serial I/F for connecting the command controller 309 and the image data controller 203 to each other.

The operation and processing of the components of the image processor 204 will now be explained. The dither processor 303 subjects the image data, which has been input from the image data controller 203, to dither processing by the use of dither matrices. The input image data of, for example, 256-level gradation, is converted into image data of 9-level gradation.

Various kinds of dither matrices can be used in the dither processor 303. Here, two kinds of dither matrices will be adopted for the sake of simple explanation. FIG. 4 and FIG. 5 illustrate one example of matrices stored in the matrix storage 305. That is, the dither matrices, position matrices, and dispersion matrices shown in FIG. 4 and FIG. 5 are stored in the matrix storage 305.

Figure 6:
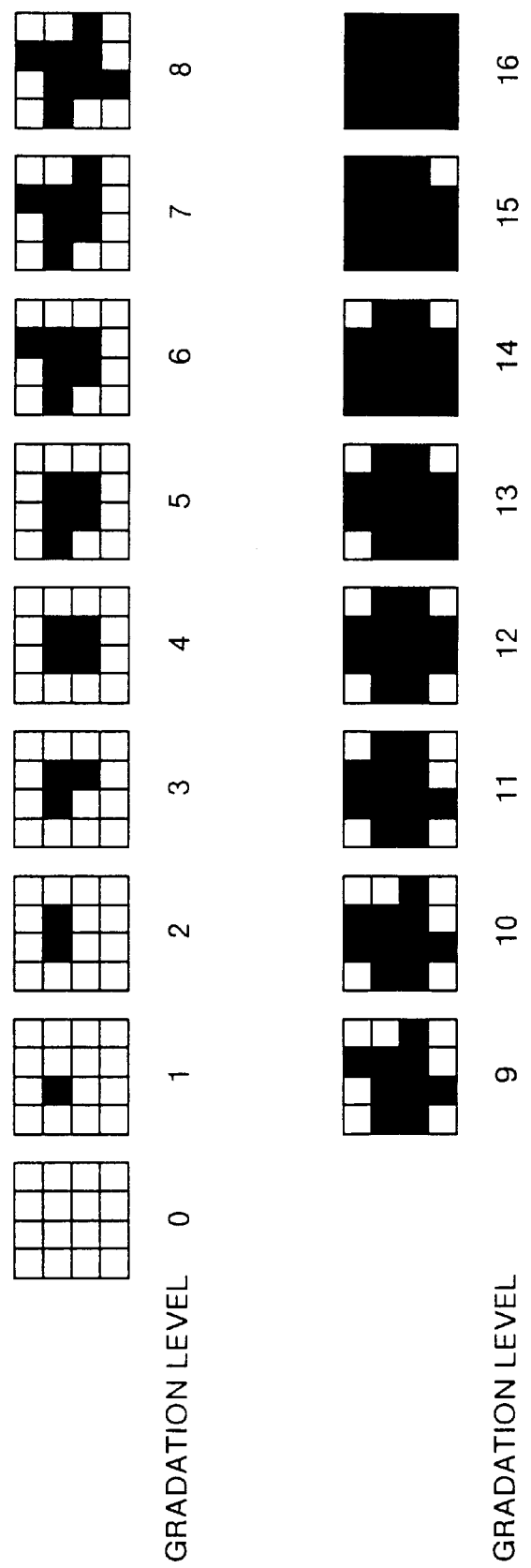
FIG. 6 illustrates one example of dither matrices of a dot-centralized type.
Figure 7:
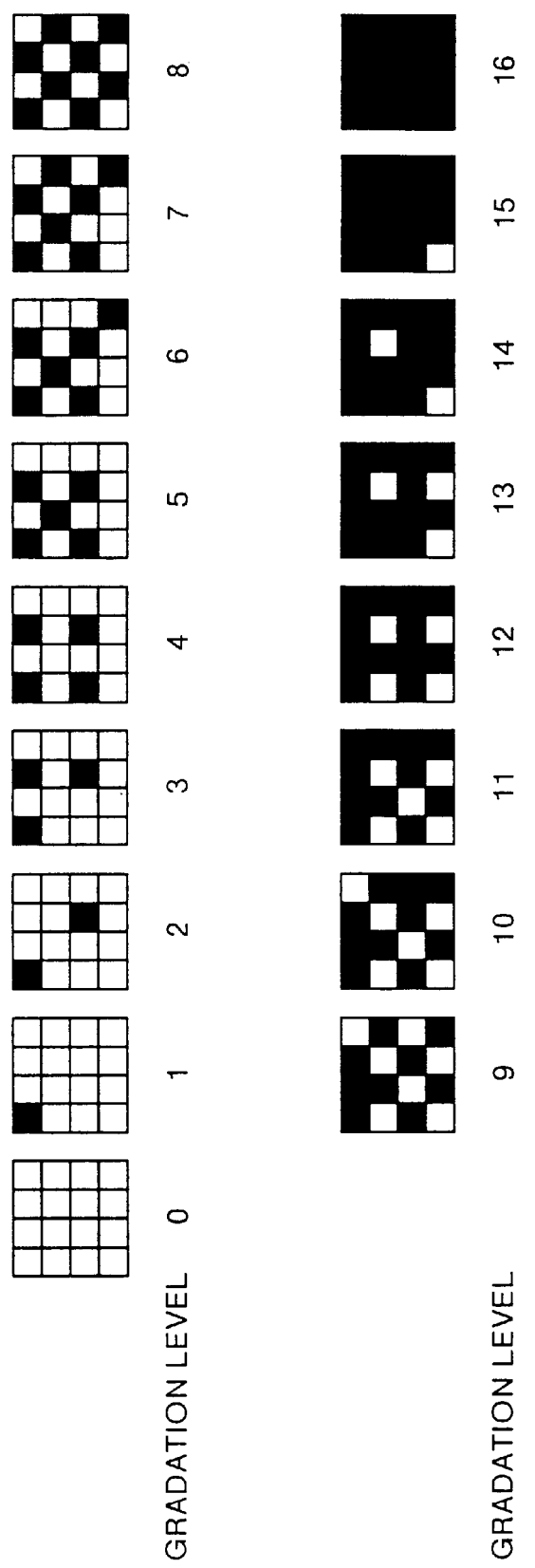
FIG. 7 illustrates one example of dither matrices of a dot dispersed type.

Dither matrices M11 to M18 illustrated in FIG. 4 represent so-called dot-centralized type matrices; in contrast, dither matrices M41 to M48 illustrated in FIG. 5 represent so-called dot-dispersed type matrices. FIG. 6 illustrates one example of dot-centralized type matrices; and FIG. 7 illustrates one example of dot-dispersed type matrices. The matrix selector 307 determines an optimum dither matrix according to the kind of document image or the like under the control of the command controller 309, and then, sends a determined one out of the dither matrices stored in the matrix storage 305 to the buffer memory 310.

Here, the optimum dither matrix according to the kind of document image signifies a dot-centralized type matrix (M11 to M18) when an image with an abrupt change in concentration such as a document composed of characters; in contrast, it signifies a dot-dispersed type matrix (M41 to M48) when an image with a moderate gradient of concentration such as a photographic document. Incidentally, the type of matrices to be used for processing in each region may depend upon the input image data.

The dither processor 303 converts the input image of 256-level gradation into an image of 9-level gradation by using appropriate dither matrices. For example, a certain 4×4 pixel region of an input image (of 256-level gradation) is assigned to 2-level and 3-level with a threshold value of 44 by the use of a dither matrix M12 stored in the buffer memory 310 (see FIG. 4). The gradations of other pixel regions also are varied in the same manner.

Next, the pixel interpolator 304 will be explained below. In general, even if each of pixels after the dither processing in the dither processor 303 is simply divided in the pixel interpolator 304 as it is, the resolution cannot be substantially enhanced. In other words, even if each of pixels after the dither processing in the dither processor 303 is simply divided in the pixel interpolator 304 as it is, the enhanced quality of an image cannot be substantially expected.

In view of this, the dither processor 303 sends, to the pixel interpolator 304, the data including the gradient of concentration of the input original image data or information on the kind of document. That is to say, the matrix selector 307 also selects position matrices and dispersion matrices corresponding to or independent of the dither matrices in selecting the optimum dither matrices out of the dither matrices stored in the matrix storage 305.

Here, the position matrix signifies a matrix having information on the direction of the gradient of the concentration at the position of each pixel as a matrix element. In other words, the position matrix signifies a matrix indicating the direction of dot growth in the image after the dither processing when the dither processing is performed by continuously increasing the concentration of the input pixel (see FIG. 4 and FIG. 5).

Namely, the position matrix is information on what order threshold values are arranged on the dither matrix in. For example, when the dot-centralized type dither matrix, the threshold values are arranged outward from the center (see FIG. 6). Therefore, for example, an upper left element of the position matrix M21 (see FIG. 4) has the directionality of the concentration distributed in such a manner that the lower right portion is darkest and the upper left portion is lightest. The position matrix is a matrix indicating the above-described direction of the contrast of the gradation.

Furthermore, the dispersion matrix represents the spatial frequency characteristics at the position of the target pixel (see FIG. 4 and FIG. 5). Although a document image normally has a fixed spatial frequency, as when an image composed of characters or a photographic image, the spatial frequency maybe different when an image of a document composed of characters and a photographic document or a document image divided into predetermined regions. The dispersion matrix signifies a matrix interlaced with the spatial frequency of the image data at each of the pixel positions. For the sake of the simplicity, a matrix element of a character image is assigned with 0, and a matrix element of a photographic image is assigned with 1.

In FIG. 4, the matrices M21 and M31 correspond to the matrix M11, wherein all of the elements of the matrix M31 are assigned with 0, and the elements at the center of each of the matrices M32 and M38 are assigned with 1 while the elements at the periphery are assigned with 0. However, various matrices may be selected without any limitation to the example described above.

The pixel interpolator 304 quadrisects each of the pixels, and simultaneously, determines the gradation of the divided fine pixel based on the gradation varied in the dither processor 303 and the information on the matrix element represented by the position matrix and the dispersion matrix. This determination is performed in reference to the conversion table.

Figure 8:
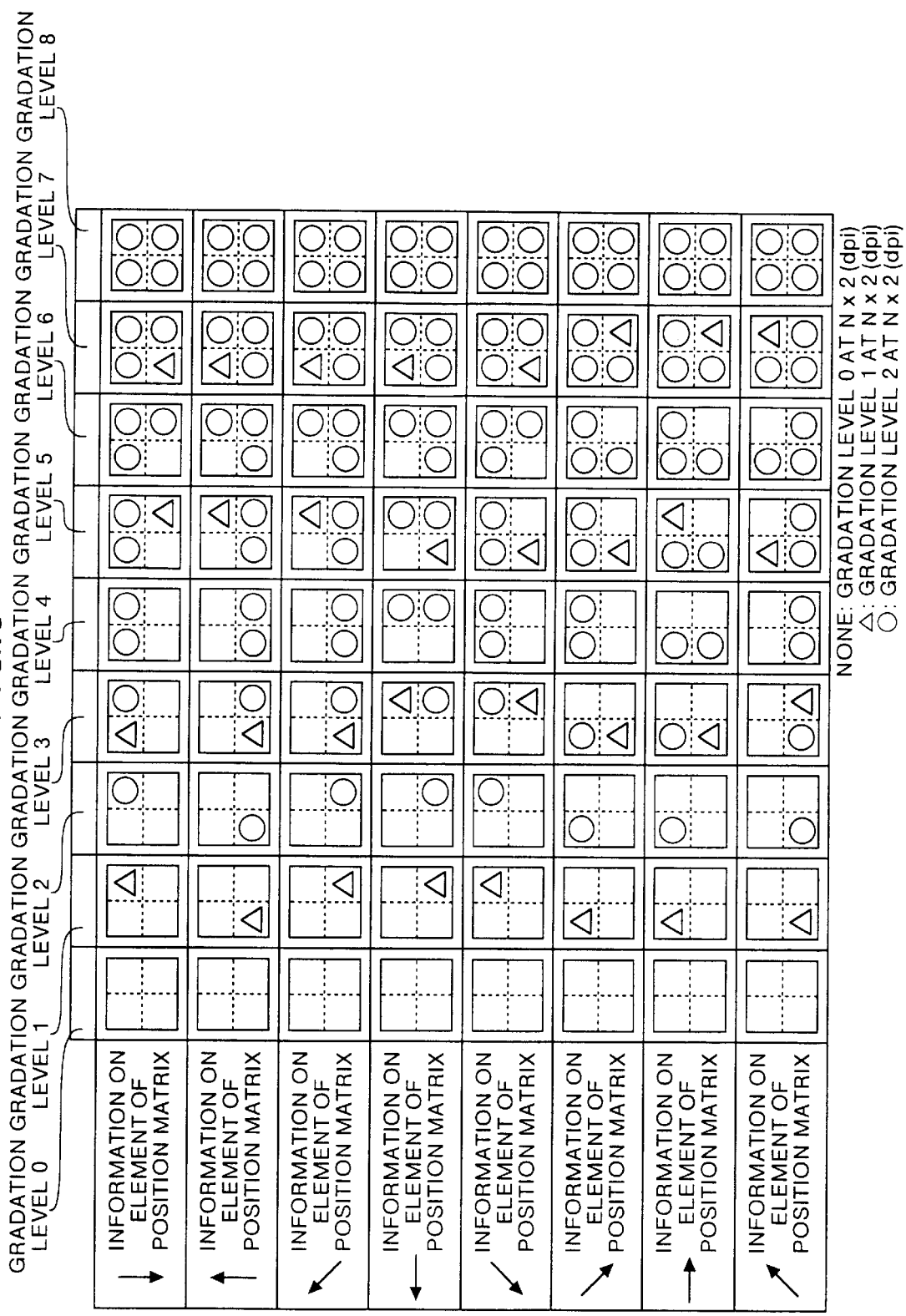
FIG. 8 illustrates one example of a conversion table with respect to a dispersion parameter 0 (a document composed of characters)
Figure 9:
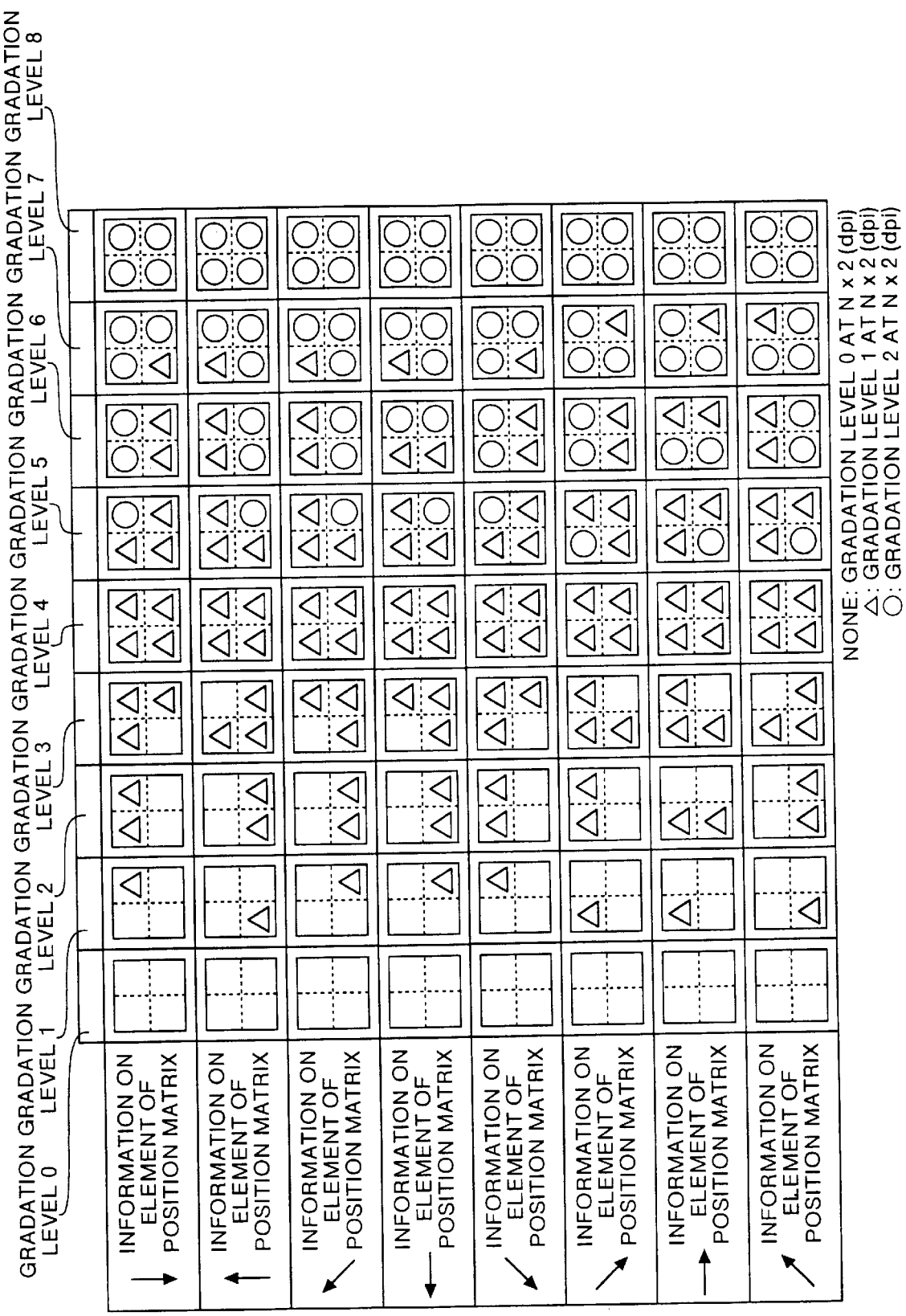
FIG. 9 illustrates one example of a conversion table with respect to a dispersion parameter 1 (a photographic document)

FIG. 8 and FIG. 9 illustrate examples of conversion tables which are used when the pixel is divided and the image data is converted into image data having a predetermined gradation; wherein FIG. 8 illustrates a conversion table for a dispersion parameter 0 (a document composed of characters), and FIG. 9 illustrates a conversion table for a dispersion parameter 1 (a photographic document). As is obvious from FIG. 8 or FIG. 9, the conversion table is used to establish the corresponding relationship between the gradation, the information represented by the position matrix and dispersion matrix, and the gradation of the fine pixel.

That is, the pixel interpolator 304 quadrisects each of the pixel of the input 9-level image data based on the information represented by the position matrix and dispersion matrix to be input at the same time, multiplies the resolution in main and sub scanning directions, and further, determines the gradation so as to reproduce the original image input in the dither processor 303 without any inconsistency.

The pixel interpolator 304 can divide the image data, and then, vary the gradation without temporarily storing the image data having an increased capacity. Moreover, the gradation can be varied only by comparing and computing the pixels based on the conversion table previously stored in the conversion table storage 306 without any complicated computation, thus eliminating any necessity of an additional computer of high performance.

Figure 10:
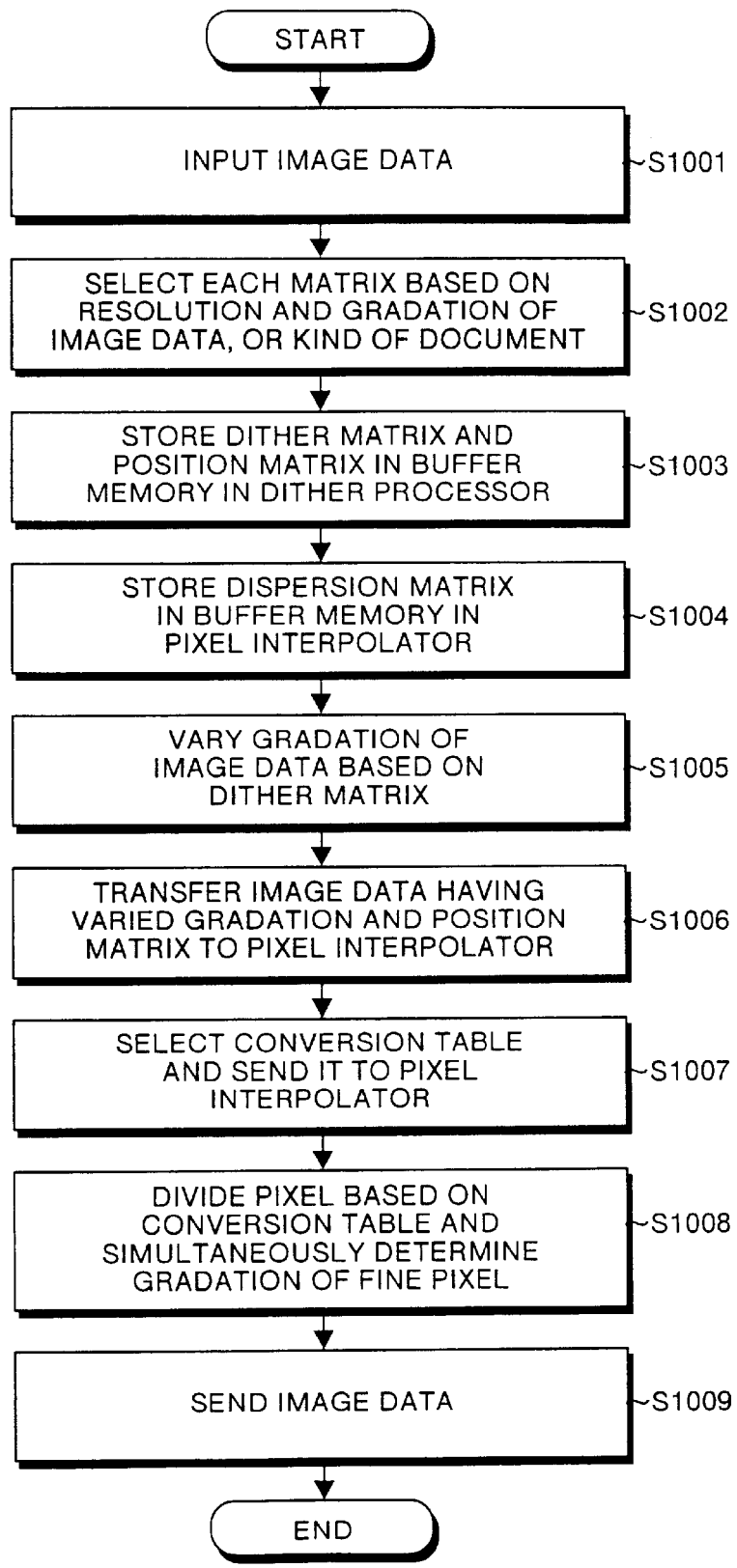
FIG. 10 is a flowchart illustrating the processing of the image processor in the present embodiment.

Finally, the processing performed by the image processor 204 will be explaiend. FIG. 10 is a flowchart illustrating the flow of the processing of the image processor 204. The image processor 204 inputs image data from the image data controller 203 (step S1001).

Required dither, position and dispersion matrices are determined based on various data on the resolution and gradation width of the input image data, the gradation level of each of the pixels, the kind of document, the distribution of a contrast and the direction of the contrast in a fine region (step S1002).

The dither and position matrices out of the determined matrices are stored in the buffer memory 310 in the dither processor 303 (step S1003); in the meantime, the dispersion matrix is stored in the buffer memory 311 in the pixel interpolator 304 (step S1004).

In the dither processor 303, the gradation of the image data is varied based on the dither matrix (step S1005). Subsequently, the image data having the varied gradation and the position matrix stored in the buffer memory 310 are transferred to the pixel interpolator 304 (step S1006).

The command controller 309 controls the table selector 308, selects the conversion table stored in the conversion table storage 306 according to the dispersion matrix, and then, controls to send the conversion table to the pixel interpolator 304 (step S1007). The pixel interpolator 304 divides the pixel based on the image data sent from the dither processor 303, the position matrix and the conversion table, and simultaneously, determines the gradation of the fine pixel (step S1008).

Finally, the pixel interpolator 304 sends the processed image data to a predetermined destination (the image data controller 203 or the video data controller 205) via the output I/F 302 (step S1009).

Figure 11:
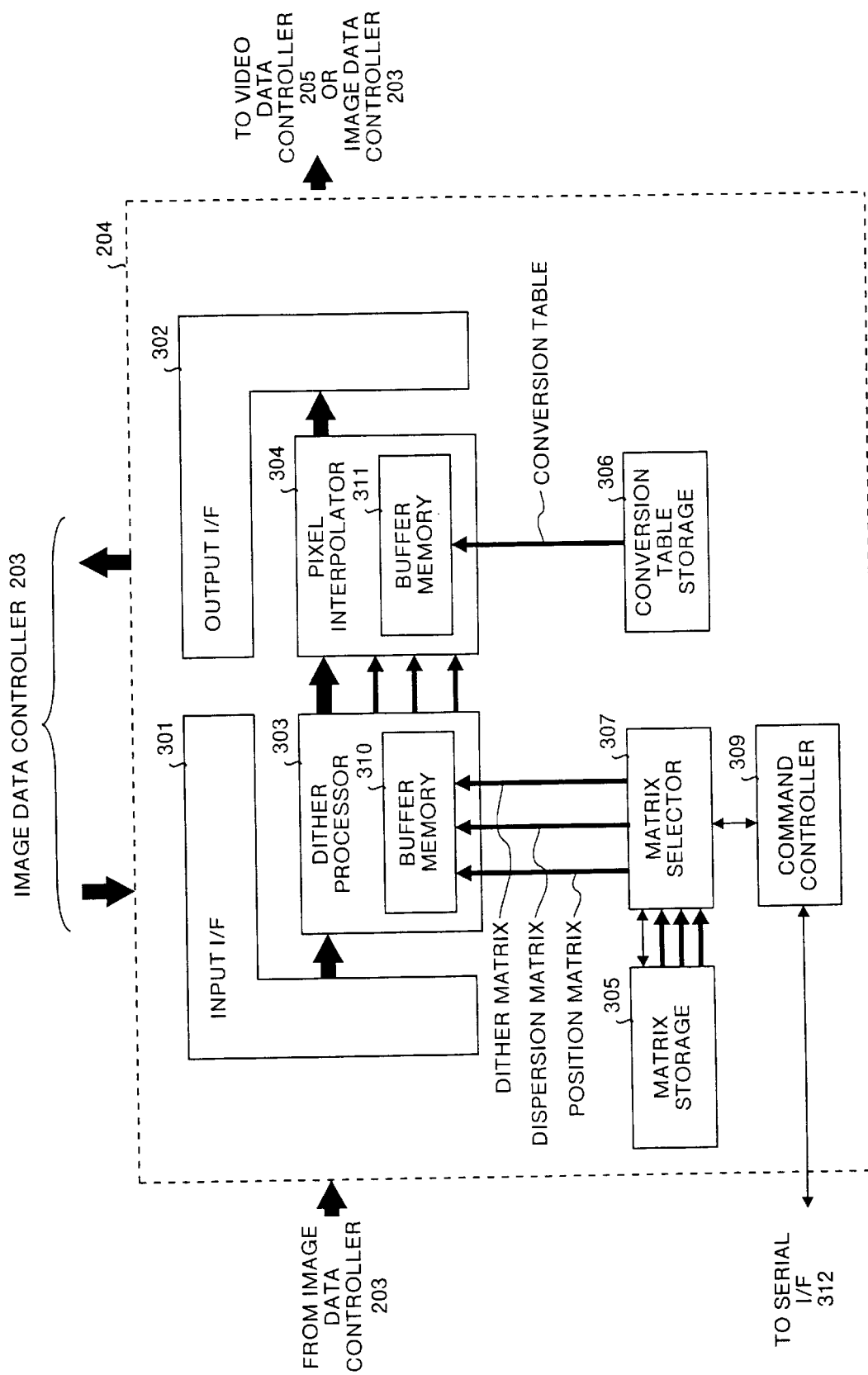
FIG. 11 is a diagram illustrating one example of the flow of matrix data.

In the above description, the position matrix is sent to the buffer memory 310, and the dispersion matrix is sent to the buffer memory 311. However, all of the matrices may be sent to the buffer memory 310, as required. FIG. 11 is a block diagram illustrating one example of the flow of the matrix data. As is obvious from FIG. 11, the dispersion matrix is stored in the buffer memory 310.

The pixel interpolator 304 inputs the image data having the varied gradation, the position matrix and the dispersion matrix, and then, receives a proper conversion table from the conversion table storage 306 based on all of the data, divides the image data, and varies the gradation. With this configuration, it is possible to dispense with any table selector, thereby simplifying the configuration of the image processor 204.

Although is not shown in FIG. 3, the image processor 204 also performs the processing of correcting deterioration of the read image data, specifically, shading correction, scanner γ correction, MTF correction or the like, besides the dither processing or the image interpolation. Moreover, the image processor 204 may also perform scaling processing such as magnification/reduction, as required.

The dither processing or pixel interpolation can form various kinds of reproduced images while varying image quality processing by the image processor 204 by temporarily storing the image data in the memory module 222. That is, different processings can be speedily performed many times with respect to one and the same image data by reading the stored image data from the memory module 222 without any re-reading of the image from the reading unit 201 every time the processing is varied.

Figure 12:
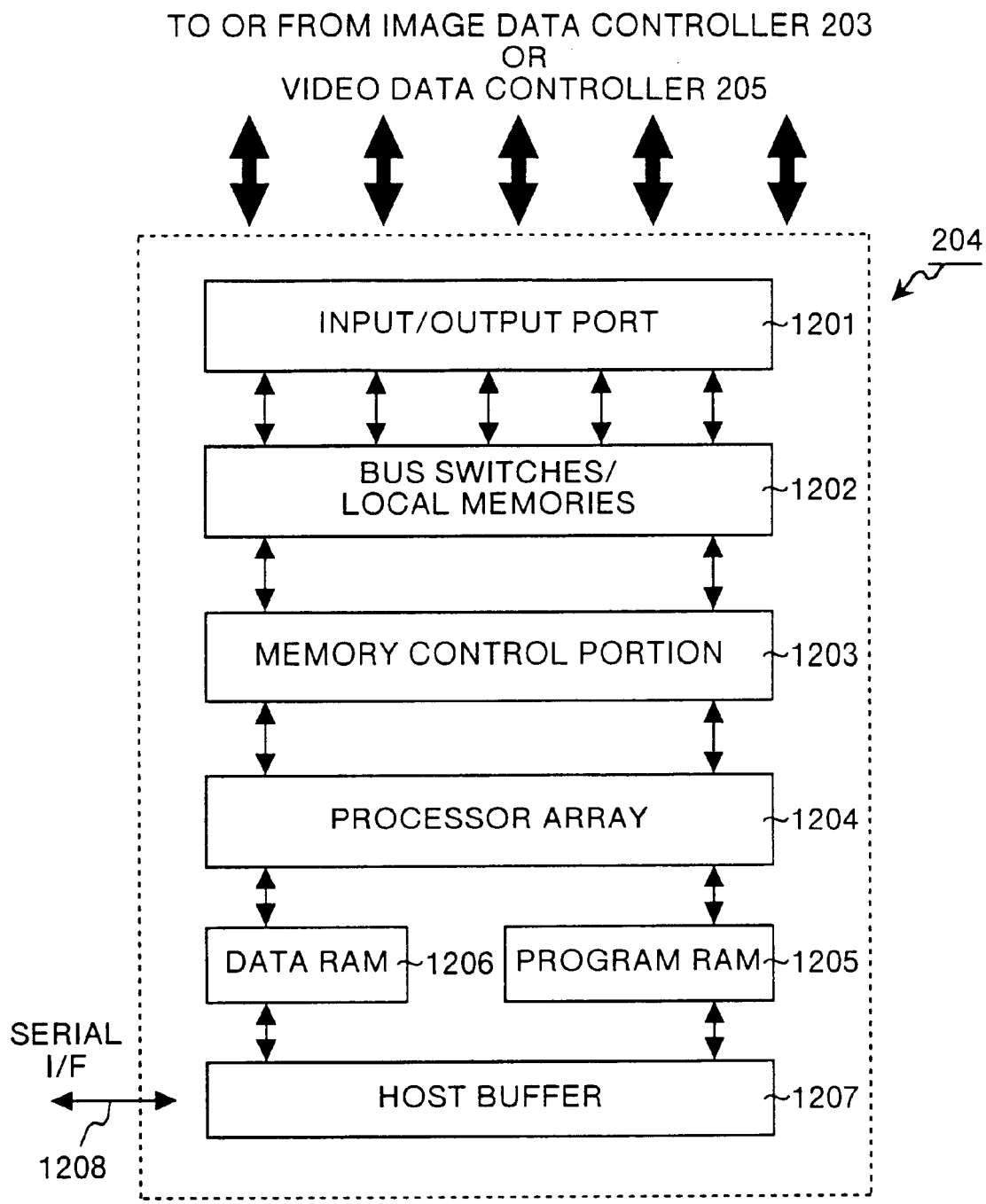
FIG. 12 is a block diagram illustrating the inside configuration of the image processor of the image processing apparatus in the present embodiment.

Subsequently, a description will be given of the inside configuration of the image processor 204. FIG. 12 is a block diagram illustrating the inside configuration of the image processor 204 of the image processing apparatus in the present embodiment. As illustrated in the block diagram of FIG. 12, the image processor 204 is provided with a plurality of input/output ports 1201 concerned in data input/output to/from the outside, each of which can arbitrarily set the input and output of the data.

Furthermore, the image processor 204 is provided therein with a group 1202 of bus switches/local memories in such a manner as to be connected to an input/output pot 1201, and a memory control portion 1203 for controlling a memory region to be used and a path of a data bus. Input data and data to be output are stored in a buffer memory, to which the group 1202 of bus switches/local memories is assigned, and thus, are restricted from an interface with the outside.

A processor array 1204 performs various processing with respect to the image data stored in the group 1202 of bus switches/local memories. An output result, i.e., the processed image data, is stored again in the group 1202 of bus switches/local memories. The procedures, parameters and the like for the processing in the processor array 1204 is transmitted or received between a program RAM 1205 and a data RAM 1206.

The contents of the program RAM 1205 and data RAM 1206 are loaded down to a host buffer 1207 from the process controller 211 through a serial I/F 1208. Incidentally, the serial I/F 1208 is the same as the serial I/F 312 illustrated in FIG. 3. Moreover, the process controller 211 reads the content of the data RAM 1206, and monitors the flow of the processing.

The state in which the content of the processing is varied or the processing mode required in the system is varied is coped with by updating the contents of the program RAM 1205 and data RAM 1206 which are directly referred to by the processor array 1204.

Figure 13:
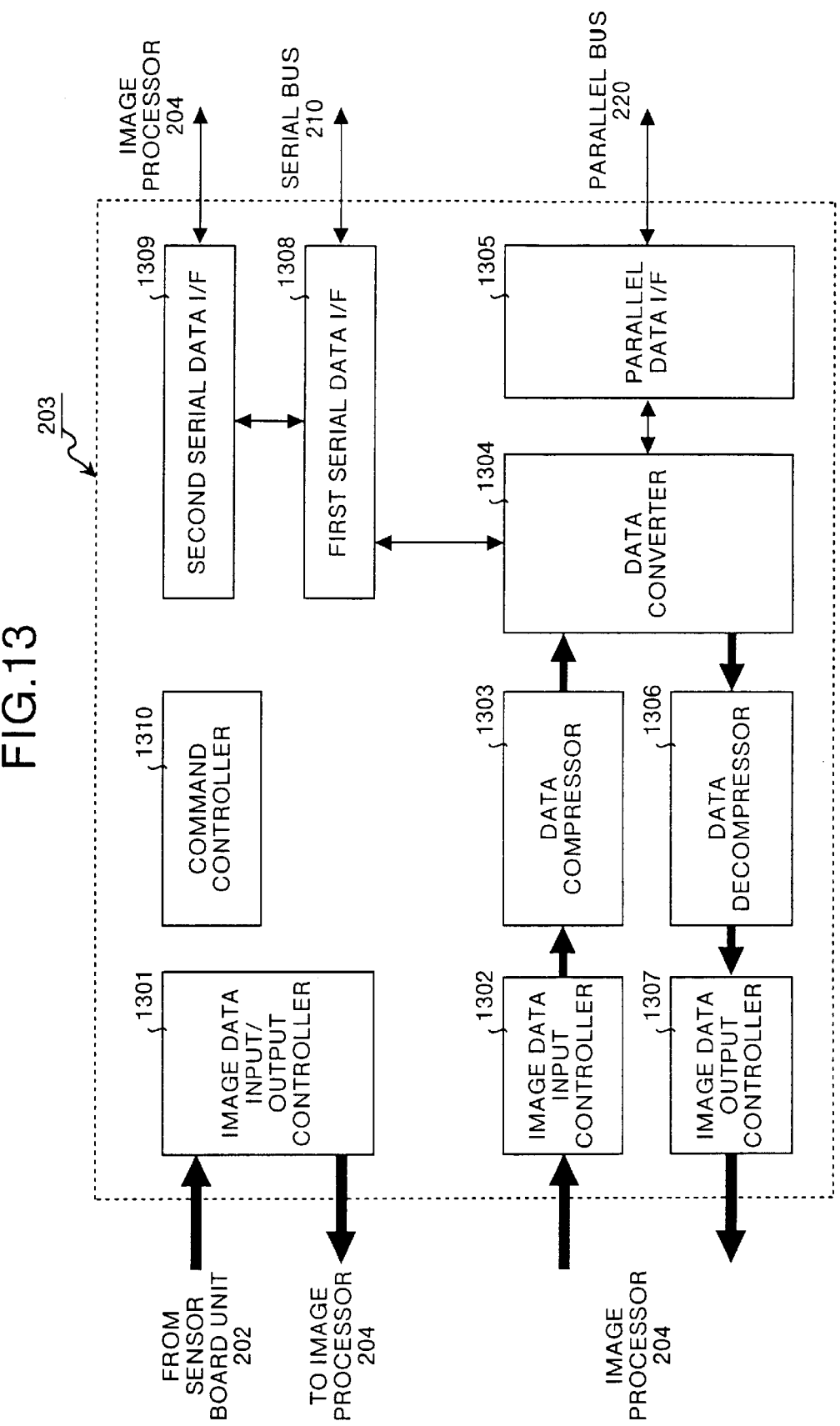
FIG. 13 is a block diagram illustrating the outline of the processing in an image data controller in the image processing apparatus in the present embodiment.

Image Data Control Unit 100/Image Data Controller 203:

The outline of the processing performed by the image data controller 203 constituting the image data control unit 100 will now be explained. FIG. 13 is a block diagram illustrating the outline of the processing in the image data controller 203 in the image processing apparatus in the present embodiment.

As illustrated in the block diagram of FIG. 13, an image data input/output controller 1301 inputs (receives) the image data from the sensor board unit 202, and then, outputs (transmits) the image data to the image processor 204. That is, the image data input/output controller 1301 is a constituent element for connecting the image reading unit 101 and the image processing unit 103 (the image processor 204) to each other, or an input/output port exclusive for merely transmitting the image data read by the image reading unit 101 to the image processing unit 103.

Furthermore, an image data input controller 1302 inputs (receives) the image data, which has undergone scanner image correction in the image processor 204. The input image data is subjected to data compressing processing in a data compressor 1303 so as to enhance transfer efficiency in the parallel bus 220. Thereafter, the image data is sent to the parallel bus 220 through a parallel data I/F 1305 via a data converter 1304.

Since the image data input from the parallel bus 220 via the parallel data I/F 1305 is compressed for the purpose of the bus transfer, the image data is sent to a data decompressor 1306 via the data converter 1304, to be thus subjected to data decompressing processing. The decompressed image data is transferred to the image processor 204 in an image data output controller 1307.

Moreover, the image data controller 203 is also equipped with the function of converting parallel data into serial data, and vice versa. The system controller 231 transfers the data to the parallel bus 220; in the meantime, the process controller 211 transfers the data to the serial bus 210. Therefore, the image data controller 203 converts the data for the purpose of the communications between the two controllers.

Additionally, a serial data I/F unit includes a first serial data I/F 1308 for transmitting or receiving the data to or from the process controller via the serial bus 210 and a second serial data I/F 1309 for use in transmitting or receiving the data to or from the image processor 204. Since one system is independently provided with respect to the image processor 204, it is possible to smoothen an interface with the image processor 204. Furthermore, a command controller 1310 controls the operations of the constituents and interfaces inside the above-described image data controller 203 in accordance with an input command.

Figure 14:
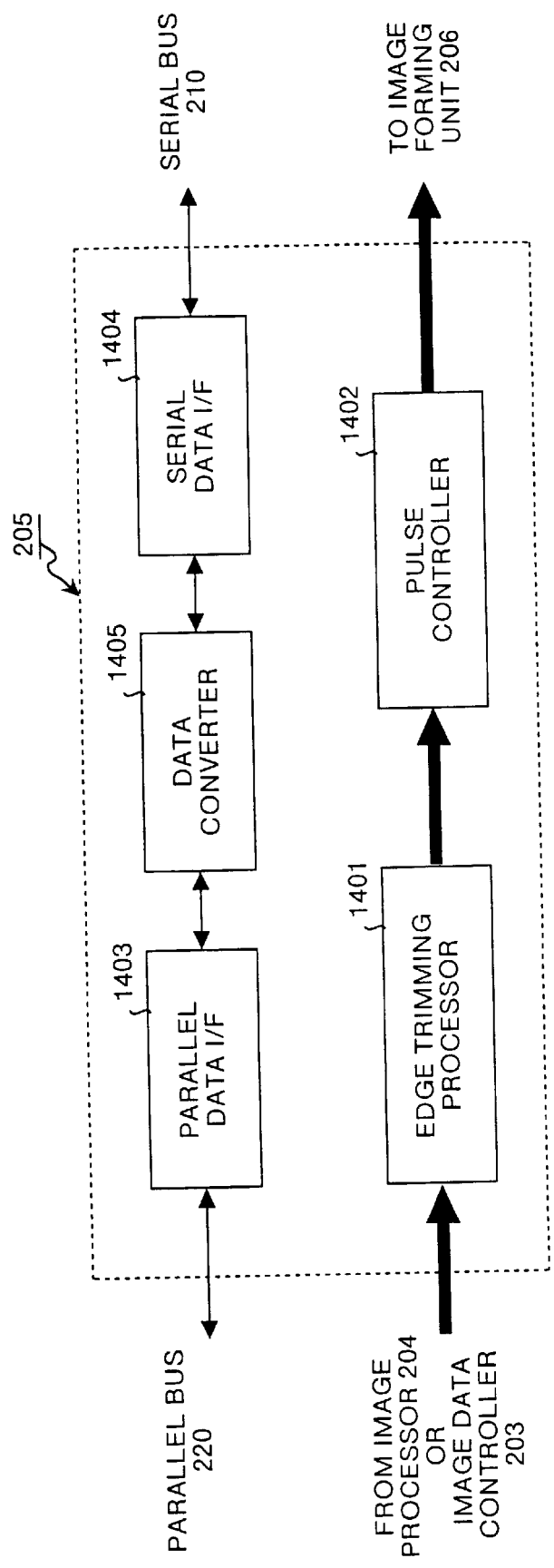
FIG. 14 is a block diagram illustrating the outline of the processing in a video data controller in the image processing apparatus in the present embodiment.

Image Writing Unit 104/Video Data Controller 205:

The outline of the processing performed y the video data controller 205 constituting a part of the image writing unit 104 will now be explained. FIG. 14 is a block diagram illustrating the outline of the processing in the video data controller 205 in the image processing apparatus in the present embodiment.

As illustrated in the block diagram of FIG. 14, the video data controller 205 subjects the image data to be input to additional processing depending upon the characteristics of the image forming unit 206. Namely, an edge trimming processor 1401 rearranges dots by edge trimming processing. A pulse controller 1402 controls a pulse of an image signal for the purpose of dot formation. The image data through the above-described processing is output to the image forming unit 206.

Besides the image data conversion, since the video data controller 205 is equipped with the format converting function for parallel data and serial data, the video data controller 205 even as a discrete unit can cope with the communications between the system controller 231 and the process controller 211. That is, a parallel data I/F 1403 for transmitting or receiving the parallel data, a serial data I/F 1404 for transmitting or receiving the serial data and a data converter 1405 for mutually converting the data received by the parallel data I/F 1403 and the data received by the serial data I/F 1404. Consequently, it is possible to convert the format of the parallel data into the format of the serial data, and vice versa.

Figure 15:
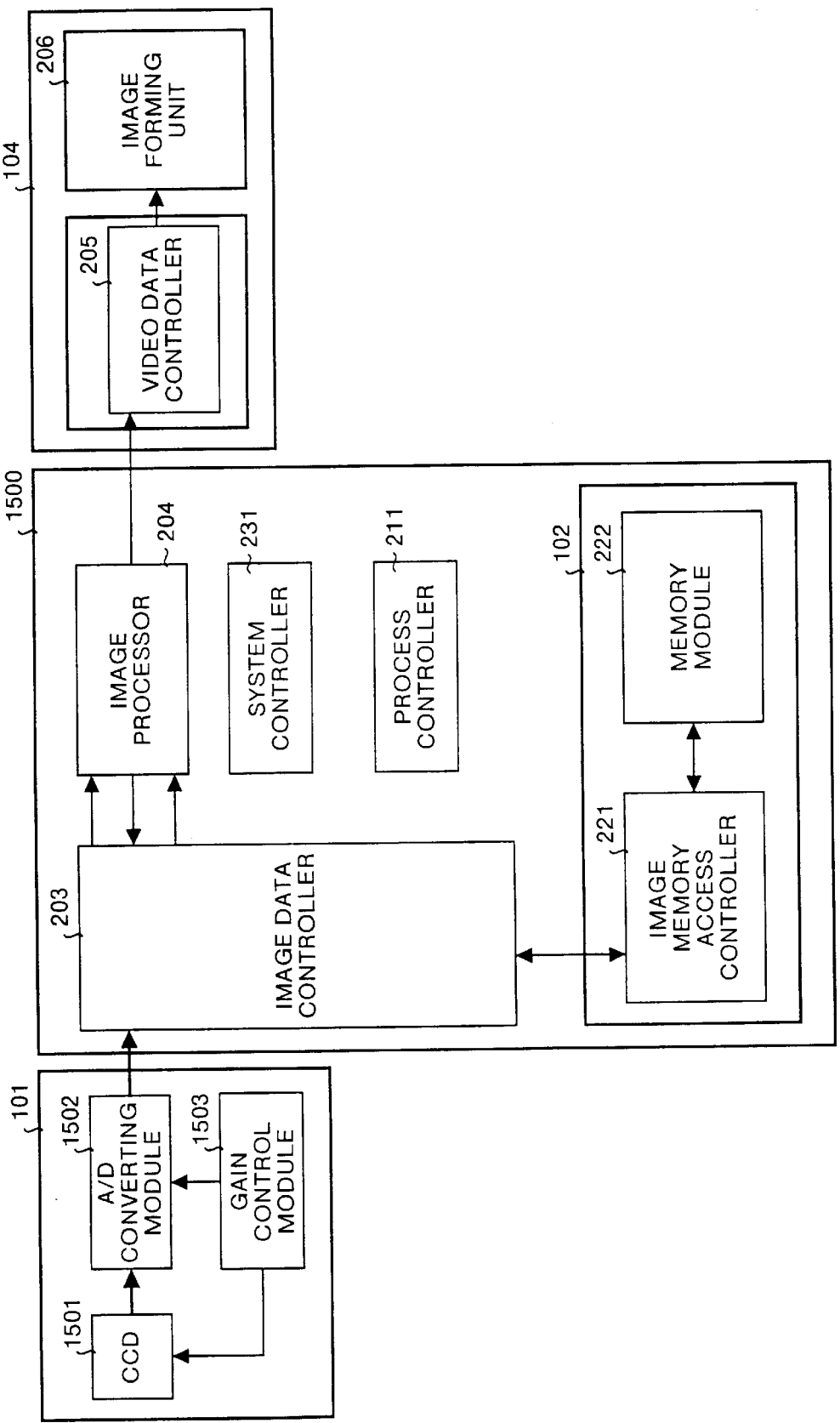
FIG. 15 is a block diagram illustrating one example of unit configuration when the image processing apparatus is a digitally combined machine.

Unit Configuration:

Unit configuration of the image processing apparatus will now be explained. FIG. 15 is a block diagram illustrating one example of the unit configuration when the image processing apparatus is a digitally combined machine.

As illustrated in FIG. 15, when a digitally combined machine, the image processing apparatus comprises three units: the image reading unit 101, an image engine control unit 1500 and the image writing unit 104, each of the three units being managed on an independent PCB substrate.

The image reading unit 101 consists of a CCD 1501, an A/D converting module 1502 and a gain control module 1503, for converting optical image information, which has been optically read, into a digital image signal.

The image engine control unit 1500 consists of mainly the system controller 231, the process controller 211 and the memory module 222 contained inside the image memory control unit 102, wherein the image processor 204, the image memory access controller 221 and the image data controller 203 in charge of the bus control are managed as a single unit.

Furthermore, the image writing unit 104 consists of mainly the video data controller 205, and includes the image forming unit 206.

In the above-described unit configuration, when the specifications and performance of the image reading unit 101 are modified, it is sufficient that only the image reading unit 101 is modified in the system of the digitally combined machine, thereby making it unnecessary to modify the other units since the data interfaces are held. Moreover, when the image forming unit (engine) 206 is modified, the system can be reconstructed by modifying only the image writing unit 104.

In this manner, since the units dependent on the input/output devices construct the system with the independent configurations, the system can be graded up by only replacing the minimum unit as long as the data interfaces are held.

In the configuration of the image engine control unit 1500 illustrated in FIG. 15, the respective modules (the constituents) of the image processor 204, image data controller 203 and image memory access controller 221 are independent of each other. Consequently, the transfer from the image engine control unit 1500 to the controller signifies the removal of an unnecessary module, and therefore, a common module is used for general-purpose use. In this manner, the similar function is fulfilled by using the common module without independently configuring the module for the image engine control and the module for the controller.

Figure 16:
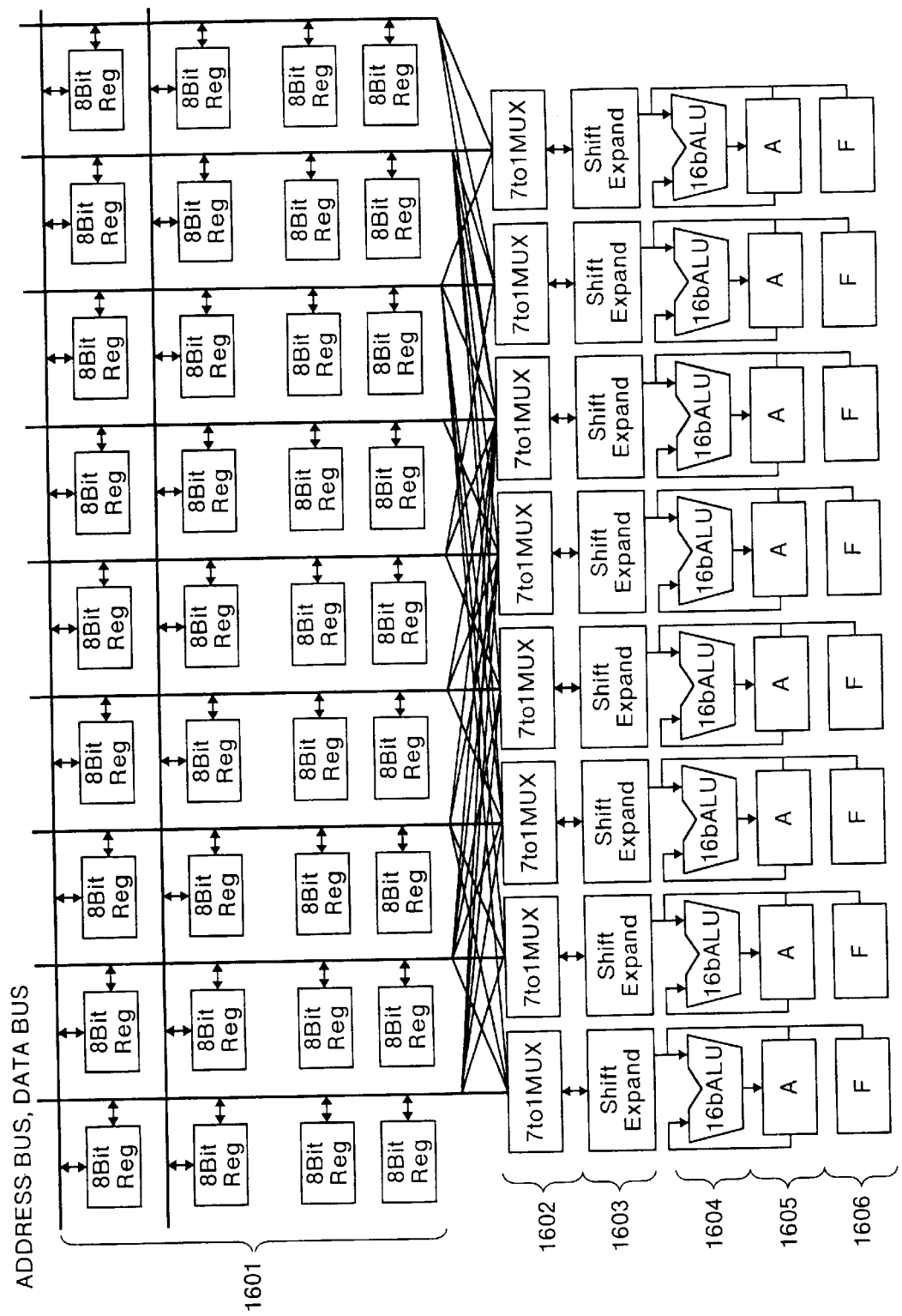
FIG. 16 is a diagram illustrating the schematic arrangement of an SIMD processor.

Configuration of SIMD Processor:

FIG. 16 is a diagram illustrating the schematic arrangement of an SIMD (single-instruction-stream, multiple-data-stream) processor. In the SIMD, a single instruction is simultaneously executed with respect to a plurality of data. The SIMD processor comprises a plurality of processor elements (PE).

Each of the PEs comprises a register (Reg) 1601 for storing data therein, a multiplexer (MUX) 1602 for accessing a register of another PE, a barrel shifter (Shift Expand) 1603, an arithmetic and logical unit (ALU) 1604, an accumulator (A) 1605 for storing a logical result therein, and a temporary register (F) 1606 for temporarily saving the content of the accumulator 1605.

Each of the registers 1601 is connected to an address bus and a data bus (a lead and a word line), for storing therein a command code for defining the processing and the data to be processed. The content of the register 1601 is input into the arithmetic and logical unit 1604. The arithmetic result is stored in the accumulator 1605. In order to fetch the result outside of the PE, the result is once saved in the temporary register 1606. The content of the temporary register 1606 is fetched to thus obtain the processing result with respect to the target data.

The instruction code of the same content is given to each of the PEs. The target data to be processed is given in a different state per PE. The arithmetic results are processed in parallel by referring to the content of the register 1601 in the adjacent PE in the multiplexer 1602, to be thus output to the respective accumulators 1605.

For example, if the content of the image data of one line is arranged in the PE per pixel, followed by the arithmetic processing in accordance with the same instruction code, the processing result by the amount of one line can be obtained in a time shorter than in sequential processing per pixel. In particular, the instruction code per PE is expressed in an arithmetic expression as it is in the space filter processing and the shading correcting processing, so that the processing can be commonly performed with respect to all of the PEs.

As described above, in the image processing apparatus in the present embodiment, the gradation of the divided fine pixel can be determined even if the fine pixel is not temporarily stored in the storage unit such as a memory. Thus, the resolution varying processing and the gradation varying processing can be performed so as to reduce the inconsistency between the input image and the output image, and further, the processing can be efficiently performed.

Moreover, it is possible to perform the image processing with the dither matrix and the like only by the comparing computation without any complicated image processing. Additionally, the image processing can be performed by the high-speed arithmetic processing by means of the SIMD type processor.

Incidentally, in the image processing method described in the present embodiment, a previously prepared program can be achieved by implementation by means of a computer such as a personal computer or a work station. This program is stored in a readable recording medium by means of a computer such as a hard disk, a floppy disk, a CD-ROM, an MO or a DVD, and is read from the recording medium by the computer to be thus executed. Furthermore, the program can be distributed from the recording medium via a network such as an Internet.

As described above, according to one aspect of this invention, the gradation direction determining unit determines the gradation direction which is the direction of the contrast of the gradation at the pixel position of the target pixel; the spatial frequency determining unit determines the spatial frequency at the pixel position of the target pixel; the dividing unit divides the target pixel into fine pixels; and the gradation determining unit determines the gradation level of the fine pixel produced by the dividing unit based on the gradation level of the target pixel, the gradation direction determined by the gradation direction determining unit and the spatial frequency determined by the spatial frequency determining unit. Consequently, the gradation of the divided fine pixel can be determined even if the fine pixel is not temporarily stored in the storage unit such as a memory, thus producing the effect that it is possible to provide the image processing apparatus, in which the resolution varying processing and the gradation varying processing can be performed so as to reduce the inconsistency between the input image and the output image, and further, the processing can be efficiently performed.

Furthermore, the spatial frequency determining unit determines the spatial frequency at the pixel position of the target pixel based on the type of the image. Consequently, the proper spatial frequency can be determined with respect to each of the pixels composing the image according to the kind of image, thus producing the effect that it is possible to provide the image processing apparatus, in which the resolution varying processing and the gradation varying processing can be performed so as to reduce the inconsistency between the input image and the output image, and further, the processing can be efficiently performed.

Moreover, the dividing unit bisects or quadrisects the target pixel. Consequently, the image data composed of the fine pixels can be controlled by the simple control, thus producing the effect that it is possible to provide the image processing apparatus, in which the resolution varying processing and the gradation varying processing can be performed so as to reduce the inconsistency between the input image and the output image, and further, the processing can be efficiently performed.

Furthermore, the gradation varying unit varies the gradation level of the target pixel to the gradation level in the range narrower than that of the gradation level. Consequently, the capacity of the image data can be reduced, thus producing the effect that it is possible to provide the image processing apparatus, in which the resolution varying processing and the gradation varying processing can be performed so as to reduce the inconsistency between the input image and the output image, and further, the processing can be efficiently performed.

Moreover, the gradation varying unit compares the gradation level of the target pixel with a predetermined threshold, so as to vary the gradation level of the target pixel. Consequently, the gradation level can be varied by a simple comparing operation, thus producing the effect that it is possible to provide the image processing apparatus, in which the resolution varying processing and the gradation varying processing can be performed so as to reduce the inconsistency between the input image and the output image, and further, the processing can be efficiently performed.

Furthermore, the gradation varying unit varies the gradation level of the target pixel by the use of a predetermined dither matrix. Consequently, the gradation levels of the plurality of target pixels can be varied by one simple comparing operation, thus producing the effect that it is possible to provide the image processing apparatus, in which the resolution varying processing and the gradation varying processing can be performed so as to reduce the inconsistency between the input image and the output image, and further, the processing can be efficiently performed.

Moreover, the gradation determining unit determines the gradation level of the fine pixel produced by the dividing unit based on the dither matrix and the element position of the dither matrix. Consequently, the gradation level of the fine pixel can be varied by a simple comparing operation, thus producing the effect that it is possible to provide the image processing apparatus, in which the resolution varying processing and the gradation varying processing can be performed so as to reduce the inconsistency between the input image and the output image, and further, the processing can be efficiently performed.

According to another aspect of this invention, the gradation direction, which is the direction of the contrast of the gradation at the pixel position of the target pixel, is determined in the gradation direction determining step; the spatial frequency at the pixel position of the target pixel is determined in the spatial frequency determining step; the target pixel is divided into fine pixels in the target pixel dividing step; and the gradation level of the fine pixel produced in the dividing step is determined in the gradation level determining step based on the gradation level of the target pixel, the gradation direction determined in the gradation direction determining step and the spatial frequency determined in the spatial frequency determining step. Consequently, the gradation of the divided fine pixel can be determined even if the fine pixel is not temporarily stored in the storage unit such as a memory, thus producing the effect that it is possible to provide the image processing apparatus, in which the resolution varying processing and the gradation varying processing can be performed so as to reduce the inconsistency between the input image and the output image, and further, the processing can be efficiently performed.

Furthermore, the gradation varying unit varies the gradation level of the target pixel to the gradation level in the range narrower than that of the gradation level. Consequently, the capacity of the image data can be reduced, thus producing the effect that it is possible to provide the image processing apparatus, in which the resolution varying processing and the gradation varying processing can be performed so as to reduce the inconsistency between the input image and the output image, and further, the processing can be efficiently performed.

According to still another aspect of this invention, the storage medium stores therein the program for allowing the computer to execute the image processing method according to the present invention.

The present document incorporates by reference the entire contents of Japanese priority documents, 11-371899 filed in Japan on Dec. 27, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus which varies resolution of an image and a gradation level of the pixels composing the image, the image processing apparatus comprising:
   a gradation direction determining unit which determines a gradation direction which is a direction of a contrast of the gradation at the pixel position of a target pixel;
   a spatial frequency determining unit which determines a spatial frequency at the pixel position of the target pixel;
   a dividing unit which divides the target pixel into fine pixels; and
   a gradation determining unit which determines a gradation level of the fine pixel produced by the dividing unit based on the gradation level of the target pixel, the gradation direction determined by the gradation direction determining unit and the spatial frequency determined by the spatial frequency determining unit.

2. The image processing apparatus according to claim 1, wherein the spatial frequency determining unit determines the spatial frequency at the pixel position of the target pixel based on the type of the image.

3. The image processing apparatus according to claim 1, wherein the dividing unit bisects or quadrisects the target pixel.

4. The image processing apparatus according to claim 1 further comprising:
   a gradation varying unit which varies the gradation level of the target pixel to a gradation level in a range narrower than that of the gradation level.

5. The image processing apparatus according to claim 4, wherein the gradation varying unit compares the gradation level of the target pixel with a predetermined threshold, so as to vary the gradation level of the target pixel.

6. The image processing apparatus according to claim 4, wherein the gradation varying unit varies the gradation level of the target pixel by the use of a predetermined dither matrix.

7. An image processing apparatus according to claim 6, wherein the gradation determining unit determines a gradation level of the fine pixel produced by the dividing unit based on the dither matrix and the element position of the dither matrix.

8. An image processing apparatus which varies resolution of an image and a gradation level of the pixels composing the image, the image processing apparatus comprising:
   a gradation direction determining means for determining a gradation direction which is a direction of a contrast of the gradation at the pixel position of a target pixel;
   a spatial frequency determining means for determining a spatial frequency at the pixel position of the target pixel;
   a dividing means for dividing the target pixel into fine pixels; and
   a gradation determining means for determining a gradation level of the fine pixel produced by the dividing means based on the gradation level of the target pixel, the gradation direction determined by the gradation direction determining means and the spatial frequency determined by the spatial frequency determining means.

9. The image processing apparatus according to claim 8, wherein the spatial frequency determining means determines the spatial frequency at the pixel position of the target pixel based on the type of the image.

10. The image processing apparatus according to claim 8, wherein the dividing means bisects or quadrisects the target pixel.

11. The image processing apparatus according to claim 8 further comprising:
    a gradation varying means for varying the gradation level of the target pixel to a gradation level in a range narrower than that of the gradation level.

12. The image processing apparatus according to claim 11, wherein the gradation varying means compares the gradation level of the target pixel with a predetermined threshold, so as to vary the gradation level of the target pixel.

13. The image processing apparatus according to claim 11, wherein the gradation varying means varies the gradation level of the target pixel by the use of a predetermined dither matrix.

14. An image processing apparatus according to claim 13, wherein the gradation determining means determines a gradation level of the fine pixel produced by the dividing means based on the dither matrix and the element position of the dither matrix.

15. An image processing method of varying resolution of an image and gradation level of the pixels composing the image, the image processing method comprising the steps of:

determining a gradation direction which is a direction of a contrast of the gradation at the pixel position of a target pixel;

determining a spatial frequency at the pixel position of the target pixel;

dividing the target pixel into fine pixels; and determining a gradation level of the fine pixel produced in the dividing step based on the gradation level of the target pixel, the gradation direction determined in the gradation direction determining step and the spatial frequency determined in the spatial frequency determining step.

16. The image processing method according to claim 15 further comprising the step of:

varying the gradation level of the target pixel to a gradation level in a range narrower than that of the gradation level.

17. A computer readable medium for storing instructions, which when executed by a computer, causes the computer to perform the steps of:

determining a gradation direction which is a direction of a contrast of the gradation at the pixel position of a target pixel;

determining a spatial frequency at the pixel position of the target pixel;

dividing the target pixel into fine pixels; and determining a gradation level of the fine pixel produced in the dividing step based on the gradation level of the target pixel, the gradation direction determined in the gradation direction determining step and the spatial frequency determined in the spatial frequency determining step.

* * * * *